(No Model.)
H. E. GILCHRIST.
BARREL TRUCK AND ELEVATOR.
No. 298,459. Patented May 13, 1884.
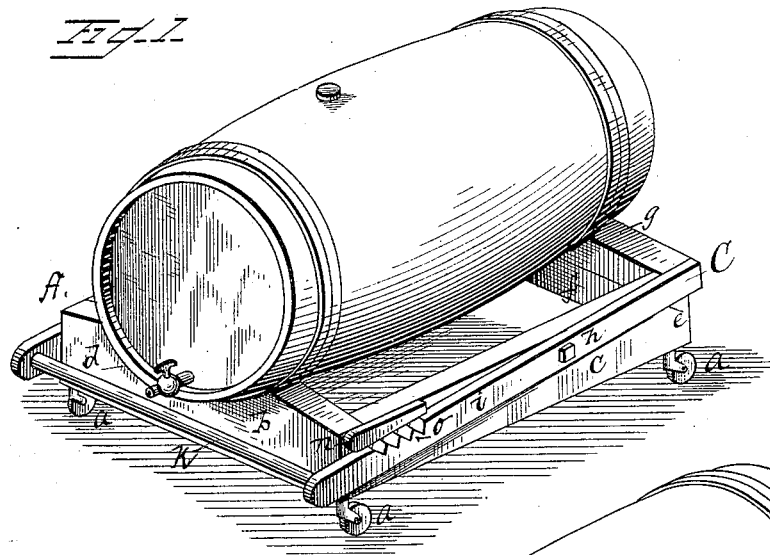
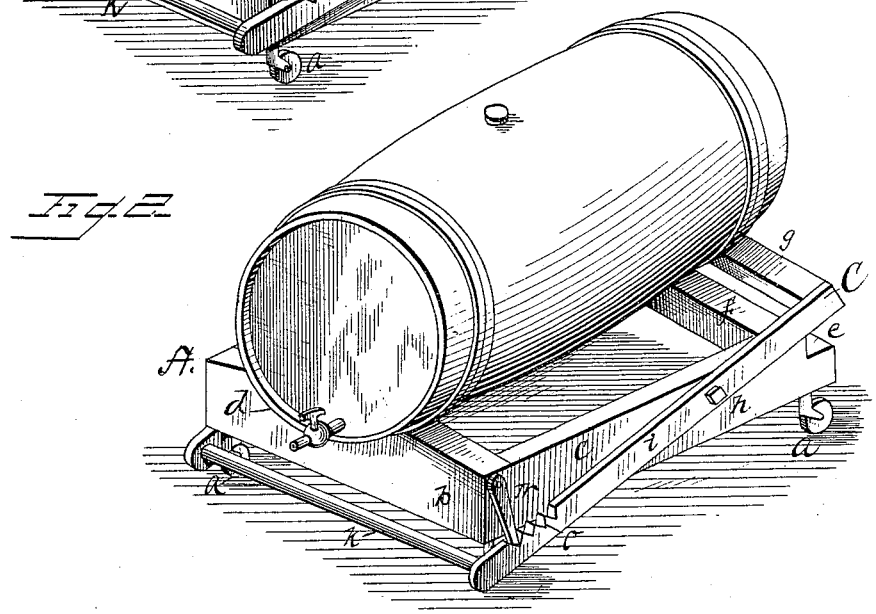
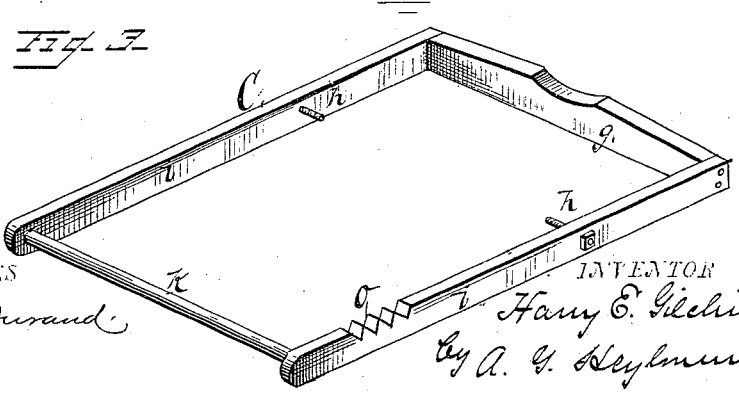
WITNESSES
Franck L. Ourand
J. Heylmun
INVENTOR
Harry E. Gilchrist
by A. G. Heylmun
Attorney

UNITED STATES PATENT OFFICE.

HARRY E. GILCHRIST, OF ONEONTA, NEW YORK.

BARREL TRUCK AND ELEVATOR.

SPECIFICATION forming part of Letters Patent No. 298,459, dated May 13, 1884.

Application filed February 19, 1884. (No model.)

*To all whom it may concern:*

Be it known that I, HARRY E. GILCHRIST, a citizen of the United States, residing at Oneonta, in the county of Otsego and State of New York, have invented a new and useful Improvement in Barrel Trucks and Elevators, of which the following is a specification.

My invention relates to a combined truck and adjustable stand for transferring and supporting barrels or other like receptacles, its object being to provide such a device, simple, compact, and inexpensive in its construction and arrangement of operative parts, whereby a barrel or other like receptacle may be readily transferred from one point to another, and also elevated to an angular or tilted position to admit the withdrawal of its entire contents, this transfer, or elevation, or both, being easily and successfully performed by one person with but little, if any, exertion, thus effecting a saving in time, labor, and expense usual to such operation.

My invention consists in the novel construction and combination of parts as will be hereinafter more fully described, and pointed out in the claim.

Referring to the drawings, forming part of this specification, Figure 1 represents a perspective view of my invention ready for use; Fig. 2, a similar view with a barrel thereon in an elevated or tilted position, and Fig. 3 is a detail perspective of the lever-frame.

The letter A represents a frame or platform mounted on casters or wheels $a$, and having the top surface of its forward end or brace, $b$, curved convexedly, so that a concave recess or seat, $d$, may be formed in its center to receive one end of a barrel or other like receptacle, the lowest point of this concave rest or seat being in line with the upper faces of the frames or platform or sides, in order that the strain of a barrel upon the truck or stand will always be on a plane parallel to said upper faces of the sides, thereby giving to the frame or platform the greatest possible supporting power. The sides $c$ of the frame or platform A have their rear ends cut away to form right-angular shoulders $e$, their remaining portions being connected by a brace, $f$, made plain upon its upper face, said shoulders and their connecting-brace forming together a seat for the rear end, $g$, of a lever-frame, C, pivotally connected to the main frame or platform A at a point away from its vertical longitudinal center, as shown at $h$. This lever-frame C has its rear or back end, $g$, curved and provided upon its upper face with a concave recess, similar to the rear end or brace of the main frame or platform A, its sides $i$ being extended beyond the forward end of said main frame or platform and connected by a brace, $k$, which forms a handle for propelling and guiding the entire truck.

When a barrel or other like receptacle is in position upon the truck, and it is desired to elevate the barrel, so as to facilitate the withdrawal of its contents, the front end of the lever-frame C is pressed down, and the barrel thus tilted, as shown in Fig. 2, the frame being held in the desired position by means of the latches or dogs $n$ on the outer side of the main frame engaging in the notches $o$ in the upper face of the sides of the frame. The latches or dogs $n$ not only automatically engage the recesses in the lever-frame, but when released from such engagement are readily brought up against the side of the main frame or platform out of the way.

In the operation of my invention, the barrel or other receptacle is skidded or lifted upon the truck, and when in position thereon rests firmly and evenly in the concave recesses of the front end of the main frame or platform and the rear or back end of the lever-frame. When the truck is thus loaded, the operator propels it to the place where the barrel or receptacle is needed, the casters upon which said truck is mounted facilitating its easy movements and proper guidance. Now, if it is desired to elevate the receptacle to an angular or tilted position, it is only necessary to press down upon the forward end of the lever-frame sufficiently to overcome the weight upon its rear, and the pivotally-hung dogs or latches will automatically drop and engage the recesses or notches in said lever-frame's inner upper sides, thus securing the same at the desired elevation, and tilting the receptacle, so that its contents may be entirely drawn off without having to block up or raise said receptacle upon a frame especially designed for such purposes, such means being often inadequate to sustain the weight of heavy barrels, and in the case of supporting-frames take up otherwise valuable space when not required for use.

What I claim, and desire to secure by Letters Patent, is—

In combination, a main supporting frame or platform mounted on casters, its forward end provided with a concave recess or seat, and its sides cut away at their rear end to form right-angular shoulders, which, in connection with a brace secured to the remaining portions of said sides, form a seat, a lever-frame pivotally connected to the main frame or platform, its sides provided with angular notches or recesses and extended beyond the front end of the main frame and connected by a brace, and latches or dogs pivoted to the sides of the main frame at its rear end, and arranged to automatically engage the notches or recesses in the sides of the lever-frame, substantially as described, and for the purpose specified.

In witness whereof I have hereunto set my hand in the presence of two attesting witnesses.

HARRY E. GILCHRIST.

Attest:
JAMES STEWART,
SYLVESTER FORD.